United States Patent [19]
Maki et al.

[11] 3,961,807
[45] June 8, 1976

[54] SAFETY HARNESS ARRANGEMENT
[75] Inventors: Takeo Maki; Kazuhiko Yoshiyuki, both of Yokohama, Japan
[73] Assignee: Nissan Motor Co., Ltd., Yokohama, Japan
[22] Filed: Oct. 17, 1974
[21] Appl. No.: 515,484

[30] Foreign Application Priority Data
Nov. 22, 1973 Japan............... 48-134734[U]

[52] U.S. Cl. ............................. 280/747; 297/389
[51] Int. Cl.² ........................................ B60R 21/10
[58] Field of Search ............ 280/150 SB; 180/82 C; 297/385, 388, 389

[56] References Cited
UNITED STATES PATENTS
| | | | |
|---|---|---|---|
| 2,891,804 | 6/1959 | Frayne et al. | 297/389 X |
| 3,418,021 | 12/1968 | Lewis | 280/150 SB X |
| 3,442,529 | 5/1969 | Lewis et al. | 297/388 X |

Primary Examiner—M. H. Wood, Jr.
Assistant Examiner—Michael J. Forman

[57] ABSTRACT

Two seats of a vehicle are provided with a shoulder belt each. A post member having a height slightly higher than the seat back is mounted on the floor between the seats. The upper ends of the shoulder belts are mounted on the post member and the lower ends detachably to stationary parts near the floor.

7 Claims, 5 Drawing Figures

SAFETY HARNESS ARRANGEMENT

The present invention relates to a safety harness arrangement for use in a motor vehicle and more particularly to a safety harness arrangement for use with a motor vehicle having at least two seats arranged abreast facing forward of the vehicle.

It has been a problem in a safety harness arrangement including a shoulder belt how and where the upper end of the shoulder belt will be anchored in the vehicle cabin especially in case the vehicle cabin contains at least two seats arranged abreast facing forward of the vehicle. When the upper end of the shoulder belt is connected to the roof rail or the center post, the shoulder belt cannot desirably restrain the vehicle occupant due to a relatively long distance between the seat and the roof rail or the center post even though the rear view of the driver may not be obstructed. When, otherwise, the upper end of the shoulder belt is connected to the roof panel, the belt can desirably restrain the seat occupant. Since, however, a fastening member for fastening the upper end of the shoulder belt onto the roof panel is to be mounted on the center portion of the roof panel, the fastening member limits the scope of the rear view of the driver and narrows the room above the seat occupant whereby the occupant is subject to dangerous collision of his head with the fastening member. When the upper end of the shoulder belt is connected to the upper portion of the seat back, the shoulder belt cannot withstand the impact force applied thereto in the event of collision since the seat back is not strong enough to withstand such impact force due to its construction.

Accordingly, it is a primary object of the present invention to provide a new and improved safety harness arrangement to be installed in a motor vehicle cabin where at least two seats are arranged abreast facing forward of the vehicle, which is preferably robust without reducing the room above the seat occupant.

Another object of the invention is to provide a safety harness arrangement which does not obstruct the rear view of the driver.

According to the present invention it has been found that the above objects can be accomplished by a safety harness arrangement which comprises a post member having a height slightly higher than the seat back and firmly fixed onto the floor to stand between two seats arranged abreast facing forward of the vehicle, at least one pair of shoulder belts respectively associated with the two seats and each anchored at one end thereof to an upper portion of the post member and at the other end thereof detachably to a stationary member positioned adjacent the floor and opposite to the post member with respect to the seat, and a fastening means for fastening the upper end of the shoulder belt to the upper portion of the post member.

The features and advantages of the safety harness arrangement of the present invention will be readily apparent from the following description read with the accompanying drawings in which.

Figure 1:
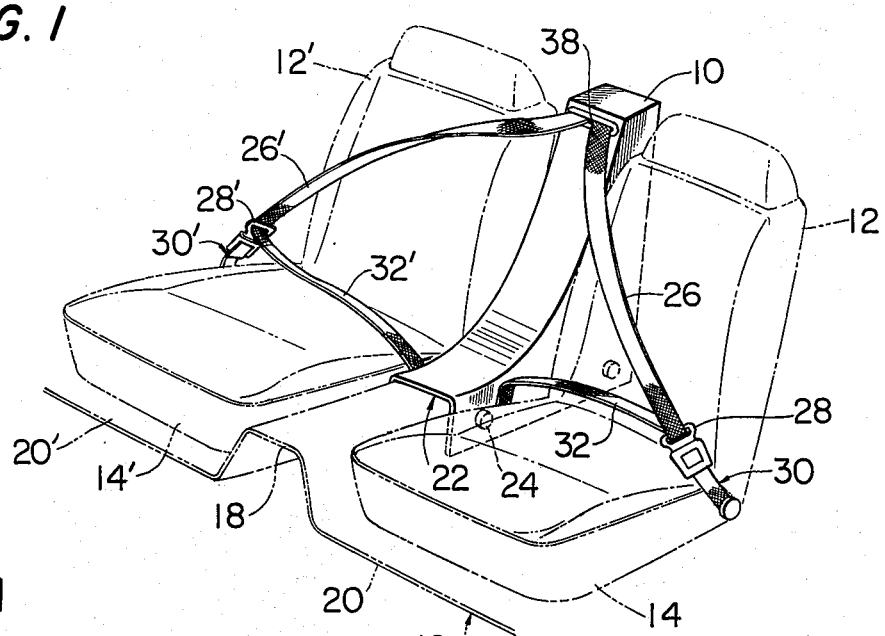
FIG. 1 is a perspective view of a preferred embodiment of the present invention.

Referring now to FIG. 1, a safety harness arrangement according to the present invention is illustrated, which comprises a post member 10 having a height slightly higher than the seat backs 12 and 12' of the seats 14 and 14' which are arranged abreast facing forward of the vehicle and illustrated in phantom lines in this Figure in order to make clear that the seats 14 and 14' are not essential to the present invention. The post member 10 is firmly fixed onto the floor 16 illustrated in phantom lines, so that the post member 10 stands between the seats 14 and 14'. When the floor 16 has a part of transmission tunnel 18 formed between its flat portions 20 and 20', the bottom portion of the post member 10 is preferably formed to have such a U-shaped cross section as indicated by 22 covering the transmission tunnel 18 in such a manner that the bottom portion of the post member 10 is fastened by means of securing means such as bolts 24.

A pair of shoulder belts 26 and 26' are respectively associated with the seats 14 and 14'. Both upper ends of the shoulder belts 26 and 26' are connected to the upper portion of the post member 10 by means of fastening means mounted on the upper portion of the post member 10. The lower ends of the shoulder belts 26 and 26' are respectively connected to retaining means 28 and 28' which are detachably connected to anchor means 30 and 30' positioned on opposite sides of the post member 10 about the seats 14 and 14'. The anchor means 30 and 30' are fastened onto suitable portions of the vehicle body, for example, the floor the bottoms of the seats 14 and 14'. Lap belts 32 and 32' may be provided for both seats 14 and 14', if preferred. The lap belt 32 has its one end connected to the retaining member 28 and the other end to a suitable portion opposite to the retaining member 28 with respect to the seat 14. The lap belt 32' is arranged in the same manner as the lap belt 32. The shoulder belt 26 and lap belt 32 are preferably constituted by a single webbing which loosely couples the retaining member 28 as shown in this figure. The shoulder and lap belts 26' and 32' may be arranged in the same manner as the belts 26 and 32.

Figure 2A:
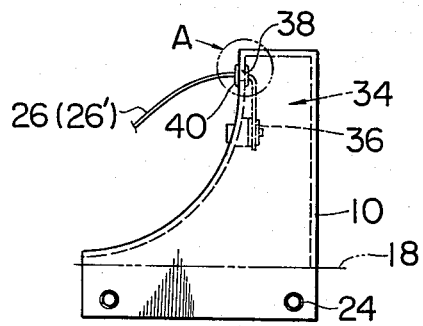
FIGS. 2A and 2B are side views of two different arrangements of a post member of the safety harness arrangement shown in FIG. 1.
Figure 3:
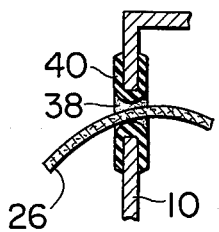
FIG. 3 is an enlarged fragmentary section view of A portions of FIGS. 2A and 2B.

FIG. 2A shows a preferred arrangement of the upper portion of the post member 10. At least the upper portion of the post member 10 is provided with a cavity 34 within which a fastening member 36 is positioned. An opening 38 is formed in the front wall of the post member 10, so that the opening 38 establishes communication between the cavity 34 and the outside of the post member 10. The upper ends of the shoulder belts 26 and 26' are connected through the opening 38 to the fastening member 36. The opening 38 is preferably fringed with a protecting member 40 made of plastic material so as to protect the shoulder belts 26 and 26', as clearly seen from FIG. 3. It is to be noted that the opening 38 may be separated into two sections for allowing the shoulder belts 26 and 26' to respectively pass therethrough, whereby unwanted tangle of the belts 26 and 26' is avoided.

Figure 2B:
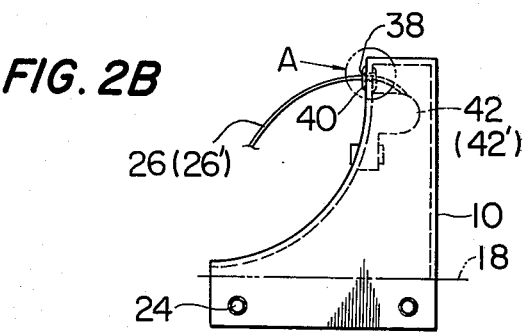

FIG. 2B shows another preferred arrangement of the upper portion of the post member 10. This arrangement is constructed identically with the arrangement of FIG. 2A, except that the fastening member 36 is replaced by a webbing or belt retractors 42 and 42'. The belt retractors 42 and 42' are arranged to retract the shoulder belts 26 and 26' to a desired extent so that the shoulder belts 26 and 26' extend along the post member 10 when the retaining member 28 is detached from the anchor means 30 and 30'.

Figure 4:
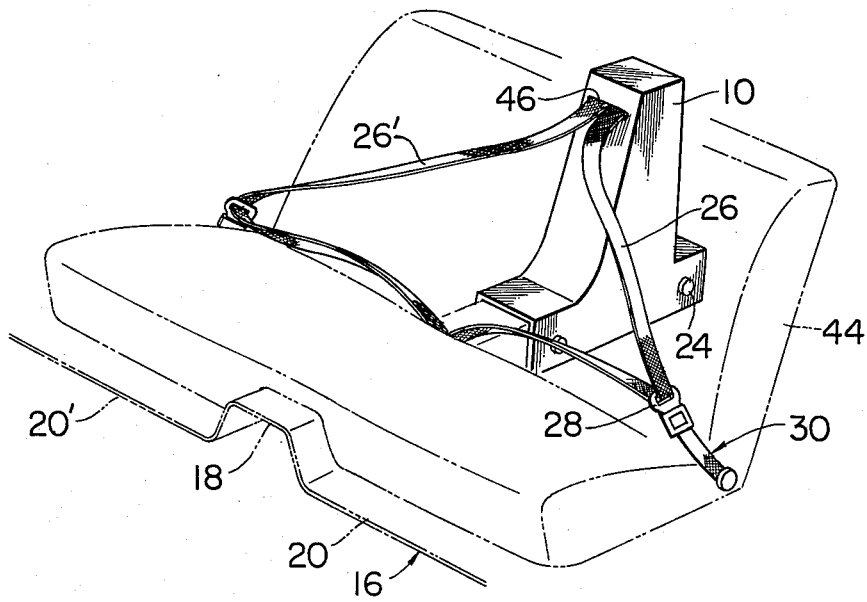
FIG. 4 is a perspective view of another preferred embodiment of the present invention.

FIG. 4 illustrates the same safety arrangement as FIG. 1, which is incorporated with a bench type seat 44. In this case, an opening 46 is formed in an upper portion of the post member 10 for allowing the belts 26 and 26' to pass therethrough.

It will be understood that the invention is not to be limited to the exact construction shown and described and that various changes and modifications may be made without departing from the spirit and scope of the invention, as defined in the appended claims.

What is claimed is:

1. A safety harness arrangement in a motor vehicle cabin in which at least one pair of seats arranged abreast facing forward of the vehicle, which comprises:
   a post member having a bottom portion thereof formed to cover the transmission tunnel provided on a vehicle floor between said pair of seats, and an upper portion thereof provided with a cavity and an opening therein establishing communication between said cavity and the outside of said post member, said bottom portion being connected to said transmission tunnel by a pair of bolts, and the cross section area of said bottom portion being larger than that of said upper portion, said post member having a height slightly higher than said seat back;
   at least one pair of shoulder belts respectively associated with said two seats and each anchored at the lower end thereof to a stationary member positioned adjacent the floor and opposite to said post member with respect to said seat; and
   fastening means positioned within said cavity for fastening the upper end of said shoulder belts to the inner surface of said post member through said opening.

2. A safety harness arrangement as claimed in claim 1, in which said fastening means comprises a belt retractor for retracting said shoulder belts through said opening.

3. A safety harness arrangement as claimed in claim 1, in which said fastening means comprises a fastener for firmly fastening said upper end of said shoulder belts to the inner surface of said post member through said opening.

4. A safety harness arrangement as claimed in claim 1, which further comprises at least two lap belts respectively associated with said two seats and each connected at one end thereof to said stationary member.

5. A safety harness arrangement as claimed in claim 4, in which said respective lap belt and shoulder belt are integral with each other.

6. A safety harness arrangement as claimed in claim 1, in which said opening is fringed with a protecting member made of plastics.

7. In a safety harness arrangement for use in a motor vehicle cabin, said motor vehicle having at least one pair of vehicle seats arranged abreast facing forward of said vehicle and with a shoulder belt associated with each of the seats;
   a post member having a bottom portion thereof firmly mounted by a pair of bolts on a transmission tunnel provided on a vehicle floor between said pair of vehicle seats, and an upper portion thereof provided with a cavity and an opening, said cavity establishing communication with the outside of said post member through said opening, the cross section of said bottom portion being larger than that of said upper portion, and further, said post member having a height slightly higher than the seat back of said seat; and
   fastening means positioned with said cavity for fastening the upper end of the respective shoulder belts to the inner surface of said post member through said opening.

* * * * *